July 23, 1929.  A. S. HUGHES  1,721,957
FRONT AXLE CUSHION FOR TRACTORS
Filed Nov. 29, 1927   2 Sheets-Sheet 1
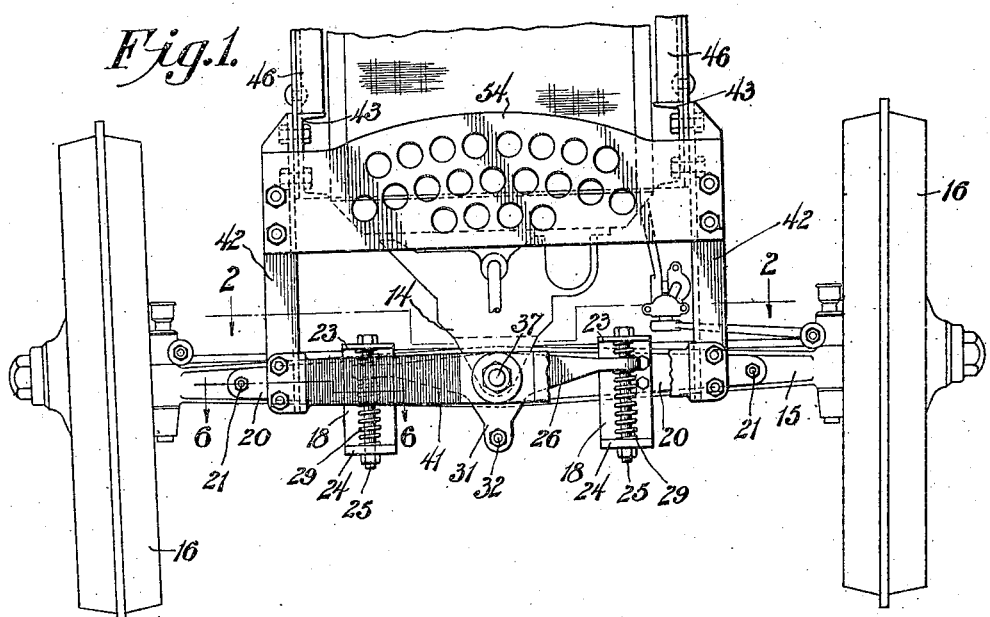
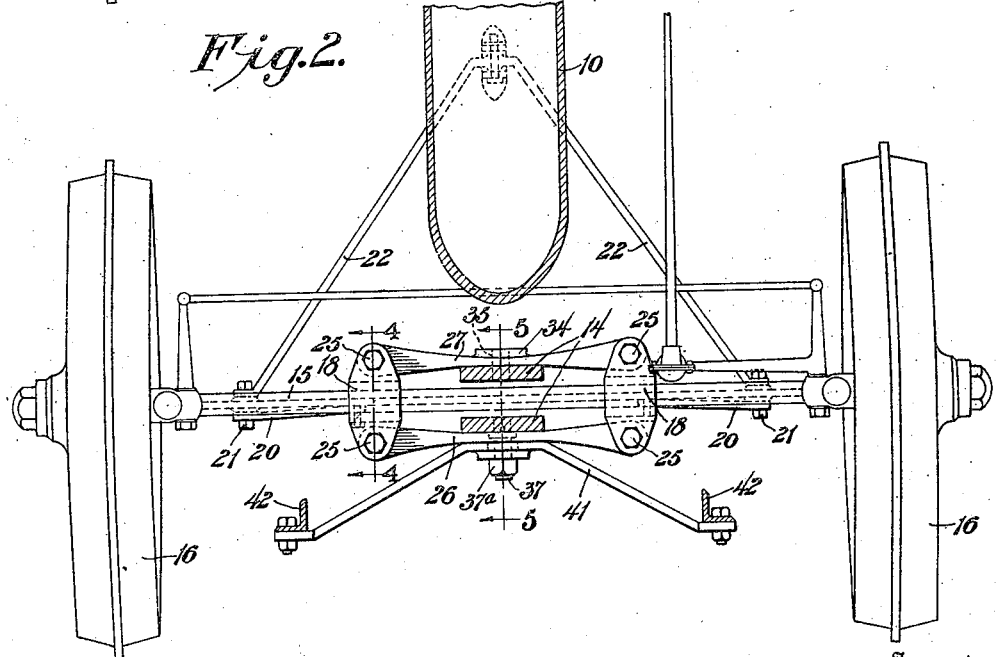
Witnesses
C. L. McDonald
Howard D. Orr
Inventor
Arthur S. Hughes
By Siggers & Adams,
Attorneys July 23, 1929.  A. S. HUGHES  1,721,957
FRONT AXLE CUSHION FOR TRACTORS
Filed Nov. 29, 1927  2 Sheets-Sheet 2
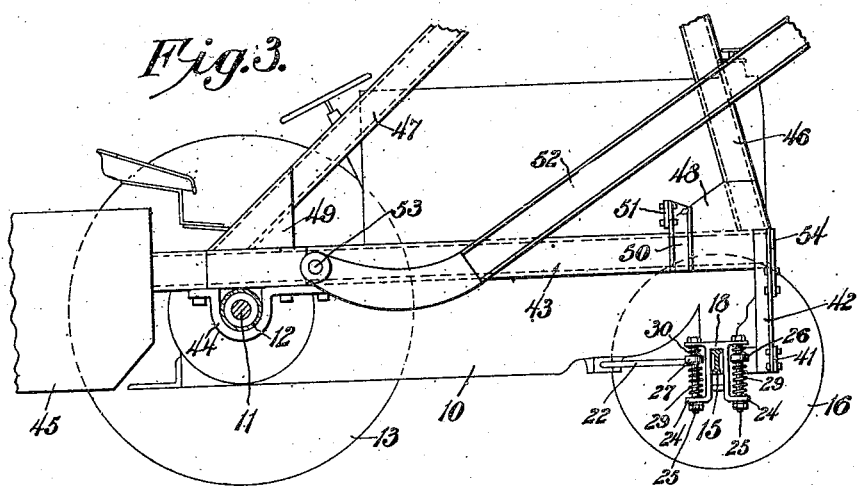
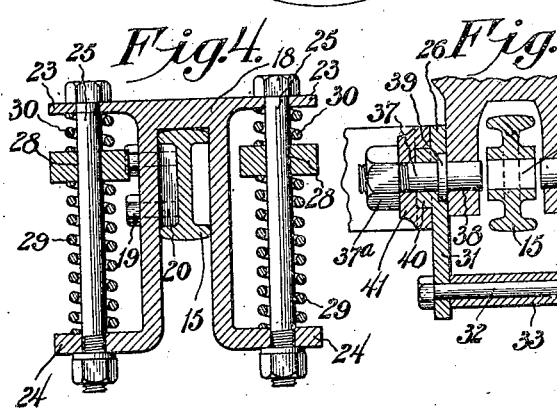
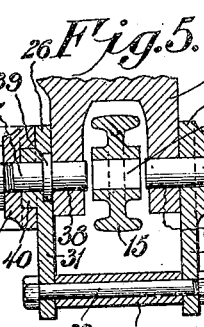
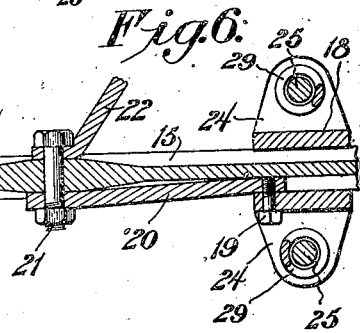
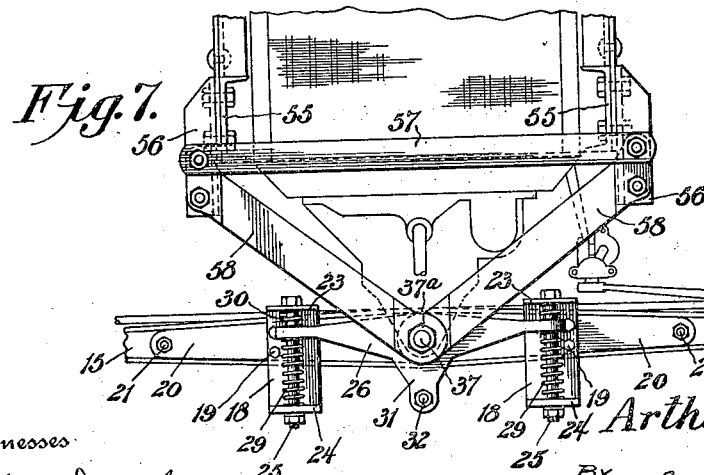
Inventor
Arthur S. Hughes
By Siggers & Adams,
Attorneys.

Patented July 23, 1929.

1,721,957

UNITED STATES PATENT OFFICE.

ARTHUR S. HUGHES, OF MANSFIELD, OHIO, ASSIGNOR TO THE HUGHES-KEENAN COMPANY, OF MANSFIELD, OHIO, A CORPORATION OF OHIO.

FRONT-AXLE CUSHION FOR TRACTORS.

Application filed November 29, 1927. Serial No. 236,492.

This invention relates to improvements in tractors, and among other objects, aims to provide means which may be easily attached to an ordinary tractor to provide a mounting for the front axle thereof for the purpose of relieving the same from shocks and strains incident to handling heavy loads, particularly over hard or rough roads. The invention is particularly useful in connection with tractors which have been converted into material handling units.

The preferred embodiment of the invention will be more particularly described in connection with the accompanying drawings, in which:

Fig. 1 is a front elevation of a portion of a tractor with an embodiment of the invention applied thereto;

Fig. 2 is a horizontal section taken substantially on the line 2—2 of Fig. 1;

Fig. 3 is a vertical longitudinal section;

Fig. 4 is an enlarged detail sectional view taken on the line 4—4 of Fig. 2;

Fig. 5 is an enlarged detail sectional view taken on the line 5—5 of Fig. 2;

Fig. 6 is an enlarged detail sectional view taken on the line 6—6 of Fig. 1; and Fig. 7 is a front elevation of a portion of a tractor illustrating another embodiment of the invention.

In converting an ordinary farm tractor into an industrial unit for general usage, it is necessary, or at least highly desirable, to provide means for absorbing the impacts and stresses to which the machine is subjected as it traverses hard roads or rough areas, and to provide means for relieving the front axle to a great extent from the shocks and strains due to the superimposed load, such means not being necessary when the tractor is used for hauling an agricultural implement over soil.

The present invention provides a cushioning means, preferably using a system of springs, for absorbing the impact of superimposed loads when dumped onto a suitable body carried by the tractor, at the same time relieving the tractor of shocks incident upon travel on rough or hard roads, such cushioning means being so arranged as to permit of the use of a full-floating front axle and not interfering with the free tilting of the latter, when one steering wheel rises or drops.

The illustrative form of the invention is shown provided on a well-known type of tractor having a body 10 and a rear axle 11 surrounded by the usual housing 12, with tractor wheels 13. Attached to the front end of the tractor body is a forked casting 14, which straddles a front axle 15, having steering wheels 16. Heretofore it has been customary to support the front end of the tractor body by a king bolt (not shown) passing through the respective flanges of the casting 14, and through a bore 17 (Fig. 5) formed centrally of the front axle; but according to the present invention, the king bolt is dispensed with and a full floating axle may nevertheless be employed.

The preferred form of the invention employs a pair of forked saddles 18, adapted to fit over the front axle 15, at opposite sides of the center thereof, as shown in Figs. 2 and 4. Each saddle 18 is secured as by bolts or screws 19 to a short bar 20, which fits between the front flanges of the axle 15, and is held against the web thereof by bolts 21, which also secure the front axle to the front end of the adjacent radius rod 22 (Fig. 2). The saddles 18 are thus held rigidly to the axle 15 and are prevented from any longitudinal movement relative thereto, without the necessity of drilling additional holes in said axle. Each saddle 18 is provided on opposite sides with upper and lower outstanding ears 23 and 24 respectively, through which pass bolts 25 for carrying springs to be described. The lower ears 24 may be made thicker than the upper ears 23, since they are subjected to greater strain, as will become apparent.

Yokes 26 and 27 are disposed respectively at the front and rear sides of the front axle, each yoke being formed preferably of a heavy metal plate increasing in width towards its ends, as shown in Fig. 2, and provided at its ends with perforations or eyes 28 (Fig. 4), to receive the respective bolts 25. A stiff coiled spring 29 surrounds each bolt 25 below the eyes of the yoke, and a similar, though shorter spring 30 surrounds each bolt above said eyes. The four springs 29 serve as a buffer to absorb the shock imposed upon the yokes as the tractor travels over uneven ground while carrying a load, or when said load is being dumped upon the superimposed material carrying means or when some other operating strain is imposed upon the tractor, while the four springs 30 serve to check the rebounding movement of the same.

Each of the yokes 26 and 27 has a central, downwardly-projecting ear 31, and these ears 31 are rigidly connected by a horizontally-disposed bolt 32 (Fig. 5) which is surrounded by a spacing sleeve 33. The rear yoke 27 is formed centrally with a boss 34, and carries a pin 35 extending into the usual king bolt hole 36 in the rear flange of the casting 14 and serves as a pivot for the rear yoke. The front yoke 26 is likewise pivotally supported by a bolt 37, which has one end projecting into the king bolt hole 38, formed in the front flange of the casting 14. The bolt 37 is provided with an intermediate circular flange 39, received in a recess formed in the front yoke 26. The front yoke 26 is also formed with a central, circular boss 40, which fits into a corresponding recess in a horizontally-disposed cross bar 41. This cross bar is adapted to pivot about the bolt 37, and is retained thereon by a nut 37$^a$. Each end of the bar 41 is extended forwardly at an angle and is secured to the lower end of a frame-supporting leg or bar 42, which is secured in depending relation to each front corner of a superimposed frame and may carry any desired equipment.

The invention, as herein described, is adapted to be used for supporting any type of frame or other tractor attachment, as well as the body of the tractor itself. In Figs. 1 and 3, I have illustrated the adaptation of the invention to the support of a hoisting attachment, such as that disclosed in my co-pending application, Serial No. 150,897, filed November 26, 1926. The main frame of this attachment, as disclosed in said application, comprises side rails 43 secured at their front ends to the legs 42 and connected to the rear axle housing 12 by stirrups 44.

A ballast box 45 may be attached to the rear end of the frame for counterbalancing the machine together with its superimposed structure. The frame also includes upwardly-inclined rails 46 and 47, which are secured to the respective side rails by corner pieces 48 and 49. Upright channel pieces 50 are likewise secured to the side rails 43, and are connected by a cross bar 51 extending across the machine between the radiator and the engine block. Suitable side booms 52 are pivoted at 53 to the frame and are guided in their up and down movements by the rails 46. A radiator shield 54, in the form of a heavy perforated plate, may also be secured to the legs 42.

In the form of the invention illustrated in Fig. 7, the attachment carried by the tractor is supported in a manner similar to that disclosed in my co-pending application, Serial No. 155,206, filed December 15, 1926 and wherein the frame includes side rails 55, having depending bars 56 secured thereto, and connected by a cross bar 57 arranged in front of the radiator of the tractor. Inclined brace bars 58 are secured at their upper ends to the bars 56 and extend downwardly and inwardly to the pivot bolt 37 to which they are connected.

It will be noted that in both forms of the present invention, the usual king bolt, which passes through the central opening 17 in the front axle, is omitted altogether. While the machine and superimposed parts are mounted on the respective bolts 35 and 37, which do not traverse the axle space between the ears 14, and the same may move to a slight extent about these alined bolts as a pivot, the weight, to a large extent, is supported by the springs 29 and bolts 25.

In crossing over a rough place or rut, the springs 29 absorb the impact, and the springs 30 absorb the recoil, and it is necessary, in order for these springs to function, to omit the usual connection through the center of the axle ordinarily effected by the king bolt. The bolts 35 and 37 are, however, maintained in their proper relative positions by the bolt 22 and spacing sleeve 33, which connect the depending ears 31 of the yokes 26 and 27. The yokes 26 and 27, and all parts connected therewith, are positively held against movement longitudinally of the front axle by the members 20, which connect the saddles 18 to the bolt 21.

From the foregoing description and a study of the accompanying drawings, it will be obvious that efficient means of great strength and durability have been provided for cushioning the front end of a tractor and relieving the front axle of undue strain when said tractor has been equipped with superimposed parts for hoisting or carrying loads directly upon the tractor, and it will be further seen that said means may be easily applied to commercial forms of tractors without the necessity for any material alteration in the parts thereof or the provision of additional bolt holes in the same.

Obviously the present invention is not restricted to the particular embodiments thereof herein shown and described. Moreover, it is not indispensable that all the features of the invention be used conjointly, since they may be employed advantageously in various combinations and subcombinations.

What is claimed is:—

1. A cushion attachment for the front axle of a tractor or the like, comprising yokes pivotally connected to the front axle ears of the tractor to permit the omission of the king bolt; saddles mounted on the axle between the center thereof and the steering wheels and held by the radius rod bolts of the tractor; cushioning means mounted in the saddles to contact with the ends of the yokes; and means connected to one of the yokes to support a superimposed frame on the tractor.

2. A cushioning attachment for the front axle of a tractor, comprising yokes transversely flanking the front depending ears of the tractor and separately pivoted thereto to permit the omission of the king bolt; saddles carried by the axle spaced from the center thereof; and springs mounted in the saddles and engaging the ends of the yokes to cushion the rocking movement of the latter.

3. A cushioning attachment for the front axle of a tractor, comprising front and rear yokes located adjacent and parallel to the front axle; separate pins centrally pivoting the yokes to the depending front axle ears of the tractor after the king bolt has been removed; spaced saddles carried by the front axle and having upper and lower ears in line with the ends of the yokes; and springs mounted in the saddles above and below said yoke ends to cushion the up and down rocking movement of the yokes.

4. Cushioning means for the front ends of tractors, comprising front and rear yokes pivotally connected at their centers to the front axle ears of the tractor by separate pins entering the king bolt holes of the same after said bolt is removed; saddles mounted on the axle in spaced relation to the center thereof; bars connected to the saddles and extending outwardly between the flanges of the front axle for terminal connection to the radius rod bolts of the tractor; coiled springs mounted in the saddles to bear above and below the opposite ends of each yoke; a front cross bar centrally pivoted to the front pivot pin and extending forwardly and outwardly; and upstanding members connected to the ends of the cross bar for supporting a superimposed structure.

5. In combination with a tractor, an attachment for the front axle of the tractor, comprising supporting members; means for resiliently securing the respective supporting members to the axle at opposite sides of its center; means below the axle for connecting said members; and means mounted on said supporting members for partially supporting any equipment which may be carried by the tractor.

6. An attachment for the front axle of a tractor, comprising two supporting yokes; means for resiliently securing the respective yokes to the axle at spaced points; and means connecting the two yokes with the front axle ears of the tractor, the king bolt being removed so that there is no direct connection between the tractor ears and the front axle.

7. An attachment for the front axle of a tractor, comprising two supporting members; means for rigidly securing the respective members to the axle; a yoke structure connecting said members; means mounted on the yoke structure for supporting the front end of the tractor body; and independent means supported by the yoke structure for partially supporting any equipment which may be carried by the tractor.

8. An attachment for the front axle of a tractor, comprising two forked saddles adapted to rest on and straddle said axle; means for retaining said saddles at equal and constant distances from the center of said axle; means adjacent the axle and resiliently connected to said saddles; and means mounted on said means which is adjacent the axle for partially supporting any equipment which may be carried by the tractor.

9. An attachment for the front axle of a tractor vehicle, comprising two forked saddles adapted to rest on and straddle said axle; means for retaining said saddles at equal and constant distances from and on opposite sides of the center of said axle; a yoke structure resiliently connected to said saddles; and means mounted on the yoke structure midway between said saddles for supporting the front end of the tractor body.

10. An attachment for the front axle of a tractor vehicle, comprising two forked saddles adapted to rest on and straddle said axle; means for retaining said saddles at equal and constant distances from the ends of said axles; a yoke structure connecting said saddles; means mounted on said yoke structure for supporting the front end of the tractor body; and independent means supported by said yoke structure for partially supporting any equipment which may be carried by the tractor.

11. An attachment for the front axle of a tractor vehicle, comprising two forked saddles adapted to rest on and straddle said axle; two yokes resiliently supported respectively by the front legs of the two saddles and the rear legs of the two saddles; each yoke having a central depending projection; means rigidly connecting the two projections below the axle in spaced relation to each other; and means connected with the yoke structure for partially supporting any equipment which may be carried by the tractor.

12. An attachment for the front axle of a tractor, comprising two forked saddles adapted to rest on and straddle said axle; a yoke structure comprising two yokes, one yoke being resiliently supported by the front legs of the two saddles, the other yoke being resiliently supported by the rear legs of the two saddles, each yoke having a central depending projection; means rigidly connecting the two projections below the axle in spaced relation to each other; and means connected with the yoke structure midway between the two saddles for supporting the front end of the tractor body.

13. An attachment for the front axle of a tractor vehicle, comprising two forked saddles adapted to rest on and straddle said axle; a yoke structure comprising two yokes, one yoke being supported by the front legs of the two saddles, the other yoke being supported by the rear legs of the two saddles; means for cushioning the connections between the saddles and yokes; means rigidly connecting the two yokes; means mounted on the yoke structure for supporting the front end of the tractor body; and independent means supported by the yoke structure for partially supporting any equipment which may be carried by the tractor.

14. An attachment for the front axle of a tractor vehicle, comprising two supporting members; means for securing the respective members to the axle at opposite sides of its center; a yoke structure resiliently supported by said members; and means connected with the yoke structure midway between said supporting members for pivotally connecting said yoke structure in supporting relation to the front end of the tractor body.

15. An attachment for the front axle of a tractor, comprising two supporting members; means for securing the respective members to the axle; a yoke structure resiliently supported by said members; a pivot connected to the yoke structure midway between said supporting members; and bars extending upwardly from said pivot for partially supporting any equipment which may be carried by the tractor.

16. An attachment for the front axle of a tractor, comprising two supporting members; means for securing the respective members to the axle at equal distances from the ends thereof; a yoke structure resiliently supported by said members; a pivot supported by the yoke structure midway betwen said members; means for connecting said pivot in supporting relation to the tractor body; and independent means connected with said pivot for partially supporting any equipment which may be carried by the tractor.

17. An attachment for the front axle of a tractor vehicle, comprising two forked saddles adapted to rest on and straddle said axle; a yoke structure comprising two yokes, one yoke being resiliently supported by the front legs of the two saddles, the other yoke being resiliently supported by the rear legs of the two saddles; means rigidly connecting the two yokes in spaced relation to each other; and means connected to the yoke structure midway between the two saddles for pivotally connecting the same in supporting relation to the front end of the tractor body.

18. An attachment for the front axle of a tractor, comprising two forked saddles adapted to rest on and straddle said axle; a yoke structure comprising two yokes, one yoke being resiliently supported by the front legs of the two saddles, the other yoke being resiliently supported by the rear legs of the two saddles; means rigidly connecting the two yokes in spaced relation to each other; a pivot located on the yoke structure midway between the two saddles; and means for partially supporting from said pivot any equipment which may be carried by the tractor.

19. An attachment for the front axle of a tractor, comprising two forked saddles adapted to rest on and straddle said axle; a yoke structure comprising two yokes, one yoke being resiliently supported by the front legs of the two saddles, the other yoke being resiliently supported by the rear legs of the two saddles; means rigidly connecting the two yokes in spaced relation to each other; pivot pins supported respectively on the two yokes midway between the saddles and in alignment with each other; means for connecting said pivot pins in supporting relation to the tractor body; and independent means connected with one of said pivot pins for partially supporting any equipment which may be carried by the tractor.

20. A mounting of the character described comprising, in combination, a yoke pivotally connected to one of the front axle ears of the tractor; a pair of saddles each secured to a short bar which fits against the front axle; a bolt connecting each radius rod to the tractor to the front axle, and also securing said short bar thereto; and springs carried by the saddles and so arranged as to resist vertical movement of the ends of the yoke.

21. A cushion attachment for the front axle of a tractor or the like, comprising, in combination, a pair of saddles secured to the front axle on opposite sides of and equally spaced from the middle of said axle; resilient means carried by the saddles; and means carried by the front axle ears of the tractor and so arranged that its motion is checked by said resilient means, the front axle being disconnected from said ears.

22. A tractor comprising, in combination, a front axle which is disconnected from the usual front end connecting ears of the tractor; a supporting structure secured to the axle on opposite sides of the mid point thereof and pivoted centrally to the connecting ears aforesaid; said supporting structure being so constructed and arranged that the front axle is a full-floating axle; and means carried by the front axle for checking vertical and rocking movements of the front end to the tractor.

In testimony, that I claim the foregoing as my own, I have hereto affixed my signature.

ARTHUR S. HUGHES.